United States Patent [19]
Hager

[11] 3,747,950
[45] July 24, 1973

[54] SHOCK ABSORBING WHEEL SUSPENSION
[75] Inventor: Clarence H. Hager, Rockford, Ill.
[73] Assignee: Modern Caster Co., Rockford, Ill.
[22] Filed: Nov. 30, 1971
[21] Appl. No.: 203,324

[52] U.S. Cl. .......... 280/124 A, 267/20 R, 267/11 R
[51] Int. Cl. ............................................. B62d 53/00
[58] Field of Search .................... 280/124 A, 124 B, 280/124 R; 267/20 A, 20 R, 11 R, 60

[56] References Cited
UNITED STATES PATENTS
1,689,038 10/1928 Lunz ................................ 267/20 R
1,605,424 11/1926 Boothroyd ........................ 267/20 A
1,659,798 2/1928 Wood ................................ 267/60

Primary Examiner—Philip Goodman
Assistant Examiner—John A. Carroll
Attorney—Vernon J. Pillote

[57] ABSTRACT

A shock absorbing wheel suspension for vehicles in which the ground engaging wheel is mounted for limited vertical and horizontal movement relative to a base by forward and rear wheel support brackets that are pivotally interconnected at their adjacent ends on the wheel axle and which are pivotally supported at their outer ends for vertical swinging and horizontal shifting movement on forward and rear suspension brackets pivotally connected to the base. Forward and rear spring assemblies are arranged to engage the forward and rear wheel support brackets to yieldably bias the wheel support brackets angularly in a direction to oppose upward movement of the wheel assembly and to also yieldably bias the forward and rear wheel support brackets horizontally in relatively opposite directions to a centered position. The mounting base is adapted to be supported for turning movement about an upright axis vertically aligned with the wheel axis when the latter is in its centered position to provide a steerable wheel assembly.

15 Claims, 7 Drawing Figures

PATENTED JUL 24 1973

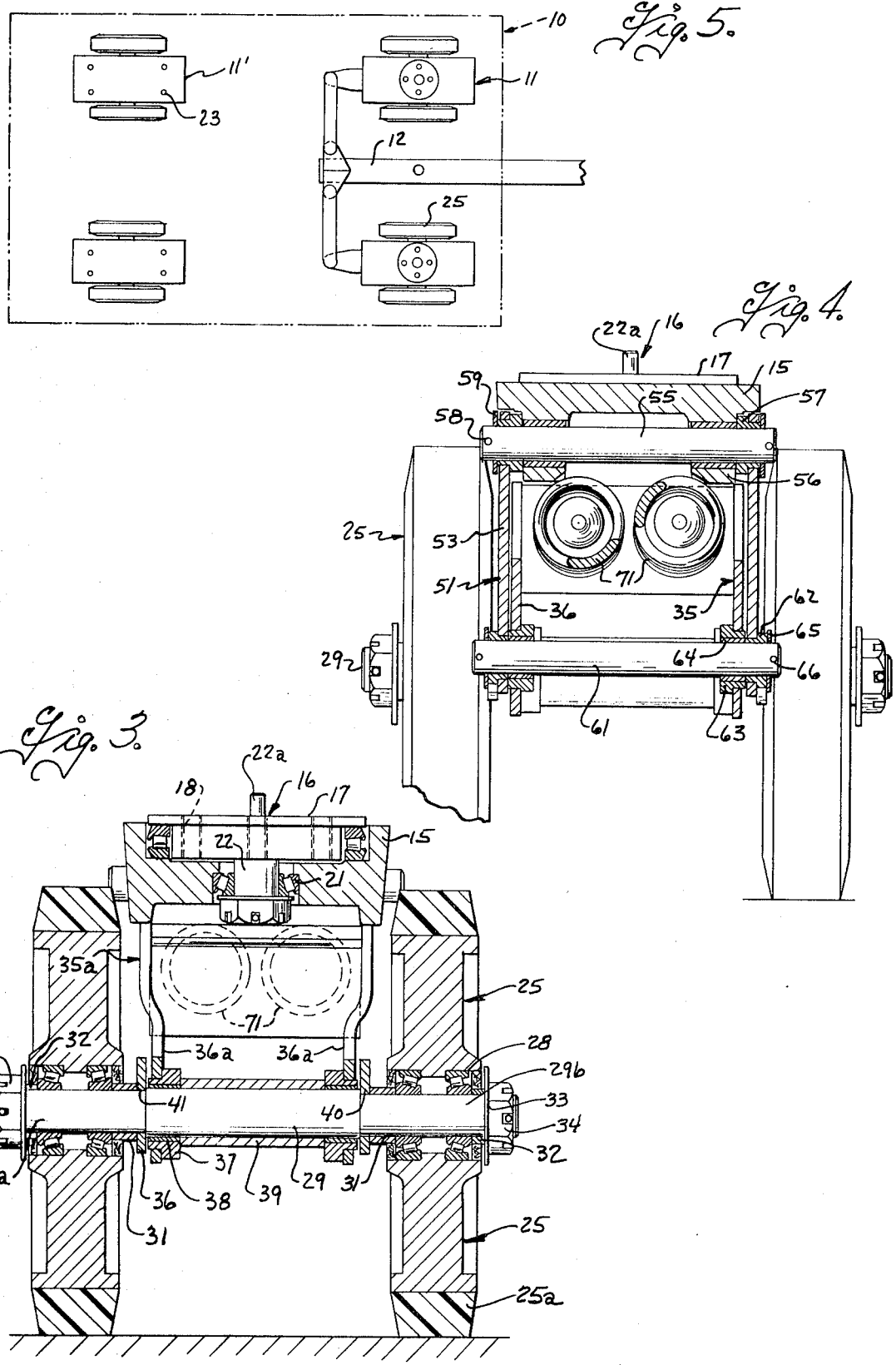

SHOCK ABSORBING WHEEL SUSPENSION

BACKGROUND OF THE INVENTION

In many vehicles such as industrial trucks, dollies and the like used for hauling stock, baggage, passengers and the like around industrial plants and freight and passenger terminals, it is desirable to maintain the wheel size as small as practical to maintain a low bed height for improved stability and load carrying capacity. However, when the wheel assemblies on such vehicles engage an obstruction, the wheel assemblies are subjected to relatively high impact forces, which impact forces increase as a function of increasing speed, weight and load and decreasing wheel radius. The impact forces on the wheels not only produce objectionable stressing of the wheel sus-pension, but also produce objectionable jolting of the load on the vehicle. When the wheels are rigidly mounted on the vehicle, the energy which must be absorbed upon impact with an obstruction, becomes very high and can cause damage to the wheel suspension and vehicle and/or load.

It has heretofore been proposed, for example as shown in the U. S. Pat. to Clark, Jr. No. 2,738,542 dated Mar. 20, 1956, to provide a shock absorbing wheel suspension for vehicles. In that apparatus, the ground engaging wheel is swingably supported by a bracket for movement upwardly and rearwardly with respect to the path of travel of the vehicle against the bias of shock absorbing springs. The upward and rearward motion of the vehicle wheel allowed by the aforedescribed apparatus functions to absorb some of both the vertical and horizontal components of the impact forces. However, as the wheel moves upwardly toward a position in which the wheel axle is horizontally aligned with the pivot axis of the wheel mounting bracket, the capability of the wheel suspension to absorb horizontal components of the impact forces is decreased. Further, by reason of the upward and rearward movement of the wheel during movement about the wheel bracket pivot axis, the shock absorbing wheel suspension disclosed in the aforementioned patent was not adapted for use as a steering wheel on a vehicle since the wheel axis could not be maintained in vertical alignment with an upright steering axis.

SUMMARY OF THE INVENTION

The present invention relates to a shock absorbing wheel suspension for use on vehicles in which the ground engaging wheels are supported for limited vertical and horizontal shifting movement by pivotally interconnected wheel support brackets that are swingably suspended by forward and rear suspension brackets from a mounting base. Forward and rear compression springs are arranged to engage the forward and rear wheel support brackets to yieldably oppose upward swinging movement of the wheel support brackets about their respective bracket axes and to also yieldably urge the forward and rear wheel support brackets to a centered position with respect to the mounting base. In another aspect of the invention, the shock absorbing wheel suspension can be utilized in a steerable wheel assembly by mounting the base for turning movement about an upright steering axis which is vertically aligned with the wheel axis when the latter is in its normal centered position.

An important object of this invention is to provide an improved shock absorbing wheel suspension unit which yieldably supports the ground engaging wheel for vertical and horizontal shifting movement relative to a mounting base and which minimizes transmission of impact forces on the wheel to the vehicle and load.

Another object of this invention is to provide a shock absorbing wheel suspension having an improved suspension and spring arrangement wherein the same springs both yieldably oppose upward movement of the ground engaging wheel and operate to normally center the wheel assembly with respect to its mounting base.

A more particular object of this invention is to provide an improved shock absorbing wheel suspension unit in which the ground engaging wheel is supported on the adjacent ends of pivotally interconnected forward and rear wheel support brackets that are swingably supported at their outer ends on forward and rear swingably mounted suspension brackets, and wherein forward and rear compression springs engage the forward and rear wheel support brackets and are arranged to yieldably oppose upward movement of the wheel and also yieldably oppose horizontal shifting of the wheel from a normal centered position.

Another object of this invention is to provide a shock absorbing wheel suspension unit in accordance with the foregoing object, in which the forces applied by the forward and rear compression springs for horizontally centering the wheel increases as a function of both the displacement of the wheel from its centered position and the load applied to the wheel suspension unit.

Still another object of this invention is to provide a shock absorbing wheel assembly in which the wheel axis is normally maintained in a centered position with respect to a mounting base so as to enable turning of the mounting base about an upright axis vertically aligned with the normal position of the wheel axis for steering.

These, together with other objects and advantages of this invention will be more readily understood by reference to the following detailed description when taken in connection with the accompanying drawings wherein:

FIG. 3 is a transverse sectional view taken on the plane 3—3 of FIG. 2;

FIG. 4 is a transverse sectional view taken on the plane 4—4 of FIG. 2;

FIG. 5 is a diagrammatic view illustrating application of the shock absorbing wheel suspension to a vehicle;

The shock absorbing wheel suspension unit of the present invention is generally adapted for use on vehicles such as industrial trucks, dollies and trailers commonly employed for hauling stock, baggage, passengers and the like around industrial plants, freight and passenger terminals, etc. The wheel suspension units can be mounted and utilized in various different wheel arrangements on the vehicle. In the embodiment shown in FIG. 5, the vehicle is shown in phantom and designated generally by the numeral 10, and one pair of the wheel suspension units 11 are mounted for turning movement about upright axes to enable steering or turning of the vehicle through a pivoted draw bar and linkage arrangement 12, and a second pair of wheel suspension units designated 11' are mounted in fixed relation to the vehicle adjacent the rear end thereof. It is to be understood, however, that the wheel suspension units can be utilized in different vehicle wheel arrangements on a vehicle and that non-steering type wheel suspension units can be utilized alone or in conjunction with other wheel suspension units such as caster units, and that, alternatively, all of the wheel suspension units 11 can be of the pivotally mounted or steering type, suitable linkage mechanism being provided to interconnect the several units with a draw bar or other steering actuator to effect simultaneous turning of all wheel suspension units in a direction and at a amplitude to enable steering of the vehicle around corners.

Figure 1:
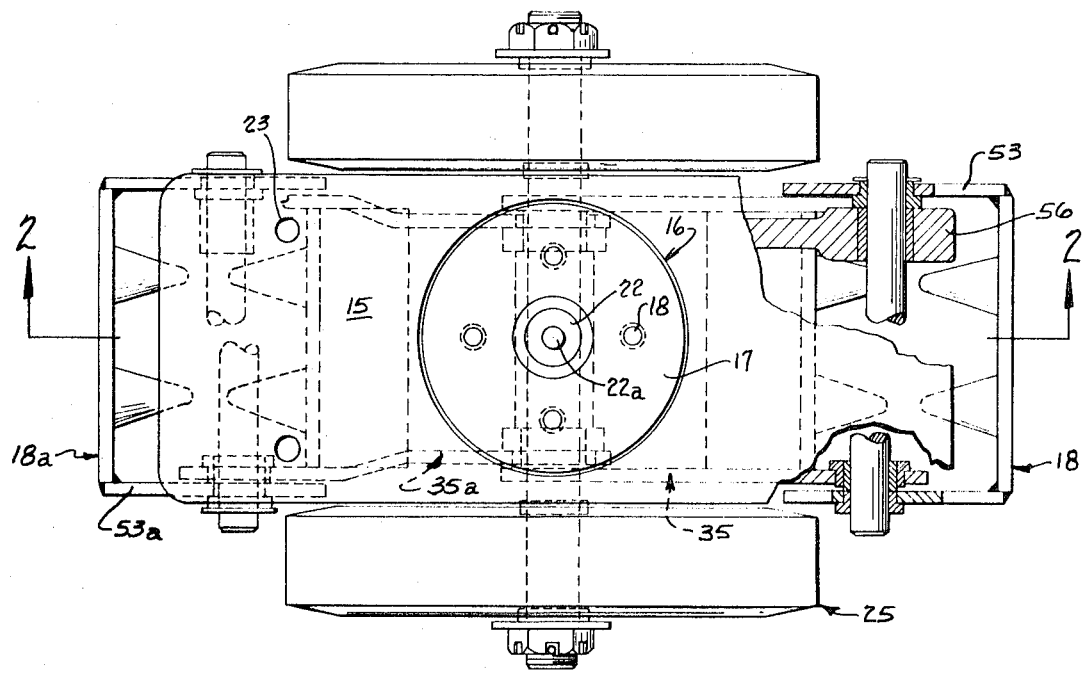
FIG. 1 is a plan view of a shock absorbing wheel suspension constructed in accordance with the present invention.
Figure 2:
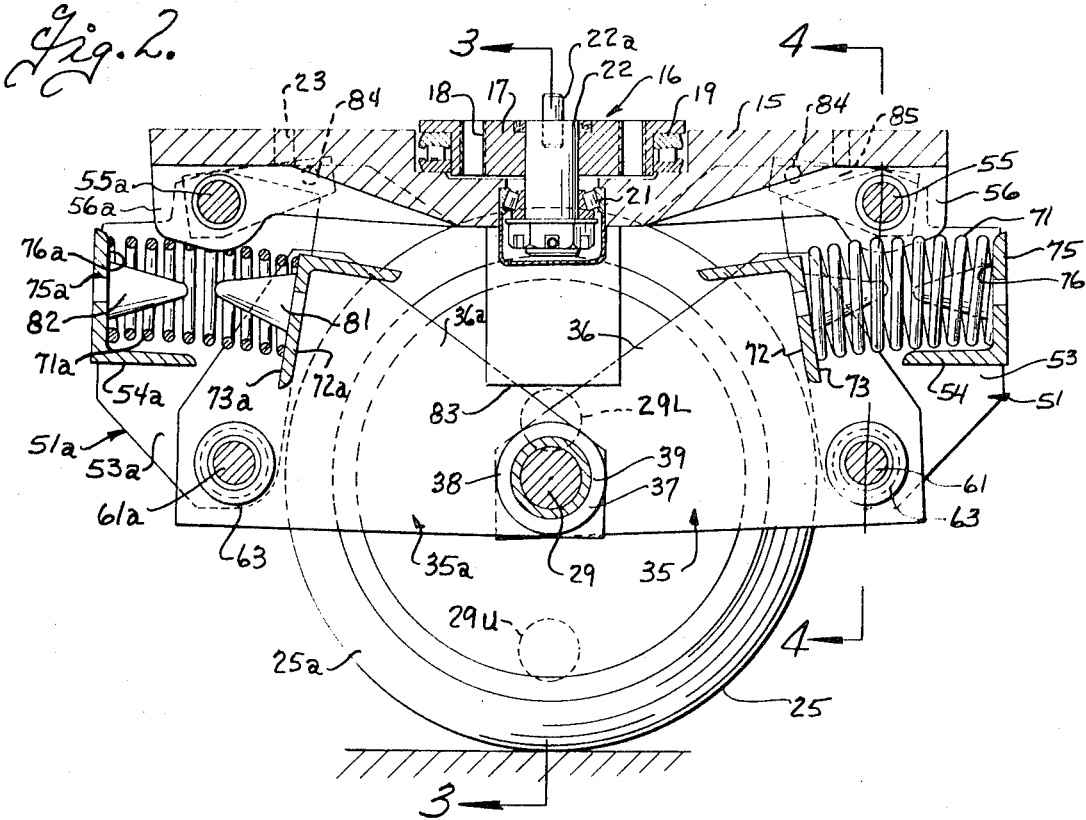
FIG. 2 is a longitudinal sectional view taken on the plane 2—2 of FIG. 1.
Figure 6:
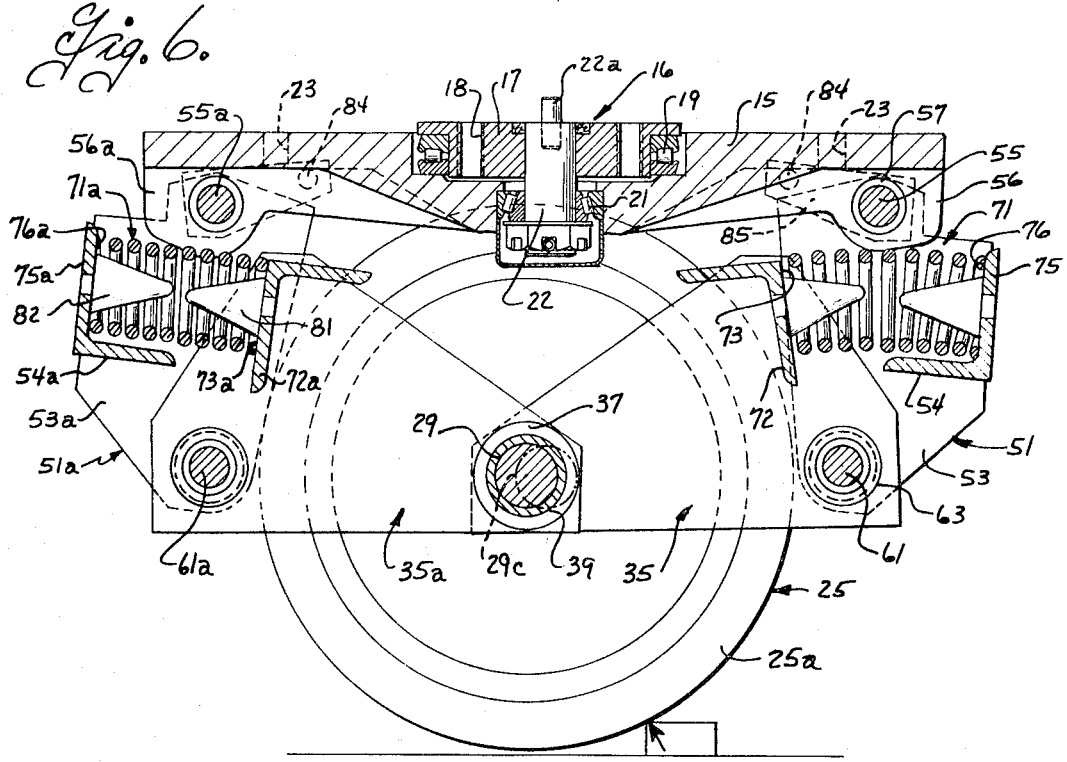
FIG. 6 is a longitudinal sectional view taken on the plane 2—2 of FIG. 1 and showing the parts in a moved position.

Referring now more specifically to the accompanying drawings, the shock absorbing wheel suspension unit in general includes a base member 15, one or more ground engaging wheels 25 mounted on forward and rear wheel support brackets 35, 35a that are suspended by forward and rear suspension brackets 51, 51a on the base member, forward and rear compression springs 71, 71a being provided to control vertical and horizontal shifting of the wheel relative to the base member. In the embodiment illustrated, the suspension unit is of the steerable type and has a pivot mechanism 16 for mounting the base member on the vehicle for turning movement about an upright axis intermediate the ends of the base member. As best shown in FIG. 2, the pivot mechanism includes a hub 17 adapted for attachment to the vehicle by studs (not shown) that extend downwardly into threaded openings 18 in the hub. The hub is rotatably supported on the base member 15 by thrust bearings 19 and radial bearings 21 spaced below the hub member and which engage an upright pivot pin 22 mounted for turning movement with the hub. A dowel 22a is conveniently provided for locating the suspension unit on the vehicle. The pivot mechanism 16 can be omitted in applications where the suspension unit is not mounted for turning movement relative to the vehicle. In such applications, the base member 15 is adapted to be rigidly secured as by fasteners arranged to extend through openings 23 in the base member. It will be understood that other arrangements can be utilized for rigidly attaching the base member to the frame and that the base member can, in non-steerable type wheel suspension units, be formed integrally with or as a part of the vehicle frame.

The ground engaging wheels 25 are supported for limited vertical and horizontal shifting movement relative to the base member. In steerable-type units, a pair of axially spaced ground engaging wheels are preferably provided and located at relatively opposite sides of the upright turning axis of the base member so as to minimize scuffing of the wheels during turning movement. The wheels can be of any suitable type but are preferably provided with a relatively thin tire designated 25a of resilient material on their periphery. As best shown in FIG. 3, the wheels 25 are supported by bearings 28 for rotation relative to a wheel axle or shaft 29. The shaft 29 has reduced diameter end portions 29a, 29b and the bearings 28 shown herein are of the anti-friction type having their inner races mounted on the reduced diameter ends of the shaft. Inner and outer thrust collars 31 and 32 are provided at opposite ends of the wheel bearings and thrust washers 33 are interposed between the outer thrust collars 32 and heads 34, herein shown in the form of nuts threaded on the outer ends of the shaft.

The wheel 29 is mounted on the inner ends of the forward and rear wheel support brackets 35, 35a and the brackets are interconnected for relative pivotal movement about the wheel axle. The forward and rear wheel support brackets are conveniently of similar construction and respectively comprise pairs of laterally spaced plates 36, 36a of generally triangular configuration. One of the wheel support brackets 35a is supported for rotation relative to the shaft 29 and, for this purpose, has axially aligned reinforcing collars 37 rigidly secured thereto and bearings 38 in the collars dimensioned to rotatably receive the intermediate portion of the shaft 29. A spacer sleeve 39 surrounds the shaft between the collars 37 to maintain the same in axially spaced relation. The other wheel support bracket 35 is preferably connected to the shaft in a manner to inhibit rotation of the shaft with the wheels. As best shown in FIG. 3, one of the plates 36 of the wheel support bracket 35 has an opening 40 of a diameter to receive the intermediate portion of the shaft 29, so as to enable axial assembly of the shaft into the wheel support brackets, and the other one of the plates 36 of the wheel support bracket 35 has an opening 41 dimensioned to receive the reduced diameter end portion 29a of the shaft 29. One of the inner thrust collars 31 (at the left in FIG. 3) is interposed between the inner race of the wheel bearings and the outer face of one plate 36 of the wheel support bracket 35, to hold the same against the shoulder formed between the end portion 29a and the intermediate portion of the shaft 29 and inhibit turning of the shaft with the wheels. The inner thrust collar at the other end of the shaft is disposed between the wheel bearing and the shoulder on the shaft formed between the reduced diameter end portion 29b, to space the wheel from the side of the wheel bracket 35.

The forward and rear wheel support brackets 36, 36a are supported by forward and rear suspension brackets 51, 51a for limited vertical swinging and horizontal shifting movement. The forward and rear suspension brackets are conveniently of like construction and respectively include laterally spaced side plates 53, 53a preferably rigidly interconnected by cross members 54, 54a. The upper ends of the forward and rear suspension brackets are swingably supported by forward and rear upper pivot pins 55, 55a on forward and rear bosses 56, 56a rigid with the base member 15. As best shown in FIG. 4, the upper pivot pins 55 extend through bearings in the bosses 56, 56a and reinforcing collars 57 are provided on the side plates 53 of each suspension bracket for supporting the same on the ends of the pivot pins. The pins are conveniently removably retained in position as by pins 58 and washers 59. The pins 55, 55a support the suspension brackets for vertical swinging movement about forward and rear axes generally paralleling the wheel axis, and the forward and rear wheel support brackets 35, 35a are supported for vertical swinging movement on the lower ends of the respective suspension bracket by pivot pins 61, 61a. As shown in FIG. 4, reinforcing collars 62 and 63 are provided on the suspension brackets and wheel support brackets respectively, and one of the collars such as the collar 63 has bearings 64 to enable free rotation of the support bracket about the axis of the respective pivot pin. The pivot pins 61 are constrained against axial movement by thrust washers 65 and locking pins 66 adjacent their outer ends.

The forward and rear wheel support brackets 35, 35a and the forward and rear suspension brackets 51, 51a support the wheel for limited vertical movement and also for limited horizontal shifting movement relative to the base member. Forward and rear spring assemblies 71, 71a are provided at the forward and rear ends of the unit and are arranged so as to yieldably bias the wheel support brackets angularly about their respective lower pivot pins 61, 61a to yieldably oppose upward movement of the wheel carried thereby and also yieldably bias the wheel support brackets horizontally in relatively opposite directions toward a centered position so as to yieldably oppose movement of the wheel out of a normal centered position. The spring assemblies 71, 71a comprise one or more coil-type compression springs, herein shown as a pair of side-wise adjacent springs, arranged to apply a force to the respective wheel support bracket which is eccentric to their lower pivot axis and in a direction to have a substantial horizontal component for centering the wheel support brackets. For this purpose, forward and rear bracket spring abutments 72, 71a are rigidly secured to the forward and rear wheel support brackets to provide forwardly and rearwardly facing spring engaging faces 73, 73a which are spaced respective the respectie lower pivot pins 61, 61a and extend generally transverse to a plane through the wheel axis 29 and the respective lower pivot pins 61, 61a. Forward and rear spring anchor abutments 75, 75a are arranged to engage the outer ends of the forward and rear springs 71, 71a at locations such that the forward and rear compression springs extend generally longitudinally of the suspension unit. In the preferred embodiment illustrated in FIGS. 1–6, the anchor abutments 75, 75a are secured to the suspension brackets 51, 51a and define abutment faces 76, 76a on the suspension brackets which are located intermediate the upper and lower pivot pins 55, 61 and 55a, 61a and which are movable with the respective suspension bracket in the same direction as the respective lower pivot pins 61, but at a lower rate.

The coil springs 71, 71a are advantageously arranged so as to have a variable effective spring rate to accommodate widely different loads on the suspension and to also dampen oscillation in the spring assemblies. As will be apparent from FIG. 2, the spring engaging faces 73, 73a on the bracket abutments and the spring engaging faces 76, 76a on the anchor abutments are disposed at their maximum acute angle relative to each other when the wheel suspension unit axle moves to its unloaded position shown in phantom at 22u in FIG. 2, and the spring engaging faces move toward, but preferably do not reach a position of relative parallelism, when the wheel assembly is at its rated load shown in the solid line position of the wheel axle in FIG. 2. The force exerted by the springs 71, 71a on the brackets 35, 35a is thus the resultant of the longitudinal bending of the springs and the axial compression of the springs. The component due to longitudinal bending decreases as the abutments move toward parallelism and the component due to axial compression increases as the spring abutments move toward each other, but at a relatively higher rate. The resultant spring force thus increases as the abutments move toward each other, but at a non-linear rate as more fully disclosed in the aforementioned U. S. Pat. to Clark, Jr. No. 2,738,542. Since the longitudinal curvature of the springs progressively decreases as the wheel suspension moves from its unloaded toward its loaded position, the natural frequency of the spring also changes for each point of deflection.

As previously described, the compression springs engage the bracket abutments 72, 72a at locations spaced radially from the respective forward and rear pivot axes 61, 61a of the wheel support brackets so that the springs bias the wheel support brackets angularly about their respective lower pivot axes in a direction to yieldably oppose upward movement of the wheels. Further, the outer or anchor abutments are located in relation to the bracket abutments so that the springs extend generally longitudinally of the wheel suspension unit and exert a force on the respective wheel support brackets having a substantial horizontal component to urge the forward and rear wheel support brackets in relatively opposite directions toward a centered position. Preferably, spring abutment faces 76, 76a on the outer spring abutments 75, 75a extend generally upright and the inner spring abutments move toward an upright position as the wheel approaches its fully loaded condition so that the axes of the forward and rear springs are disposed generallly horizontal when the wheel suspension approaches its rated load. As will be seen, the forces applied by the forward and rear spring assemblies to bias the respective wheel support brackets angularly are additive with respect to each other and, when the wheel is in its centered position, approximately one-half of the wheel load is supported by the forward spring assembly and one-half by the rear spring assembly. The forces applied by the forward and rear spring assemblies to effect centering of the wheel, however, are in opposition to each other. When the wheel is in its centered position shown in FIG. 2, the rearwardly directed horizontal component of the force applied by the forward spring assembly to the forward support bracket equals the forwardly directed horizontal component of the force applied by the rear spring assembly to the rear wheel support bracket. However, when the wheel strikes an obstruction as diagrammatically shown in FIG. 6, the wheel assembly can shift rearwardly from its centered position indicated in phantom at 29c and this increases compression of the rear spring assembly 71a while decreasing compression of the forward spring assembly 71. The differential between the horizontal components of the forces applied by the forward and rear spring assemblies builds up in a direction to oppose rearward movement of the wheel relative to the base member. Moreover, since the compression of both the forward and rear spring assemblies increases with increasing load on the wheel suspension unit, it will be seen the the centering forces exerted by the forward and rear spring assemblies will also increase with increasing load on the suspension unit.

The wheel assembly is movable upwardly and rearwardly against the bias of the forward and rear springs to pass over the obstruction and the wheel assembly will then be returned to its normal centered position. As the wheel shifts rearwardly relative to the base member it increases compression of the rear spring assembly while decreasing compression of the front spring assembly so that a greater portion of the vertical load on the wheel assembly is transferred to the rear spring assembly. As will be seen, when the anchor abutments 75, 75a are mounted on the suspension brackets, the anchor abutments shift rearwardly as the wheel support brackets shift rearwardly, but at a relatively slower rate. This is deemed advantageous in that it effectively increases the allowable horizontal movement of the wheel assembly. Stop means are advantageously provided to limit movement of the support brackets relative to the suspension brackets and relative to the base member. In the form shown, cone type members 81 and 82 are provided on the wheel brackets and suspension brackets respectively, which members extend into the ends of the springs to center and retain the springs on the respective brackets, and the members 81, 82 are preferably formed of a rigid material and are rigidly secured by welding or the like to the respective bracket to provide a positive stop when the members 81, 82 engage. The members 81, 82 can thus form positive stops for both limiting upward movement of the wheel assembly to an upper position as shown in phantom at 29*l* in FIG. 2, and the members 81, 82 also function as stops for limiting horizontal movement of the wheel relative to the base member. An additional stop means such as shown at 83 in FIG. 2 can be mounted on the base member to extend downwardly to engage the wheel axle and positively limit upward movement of the axle to the upper limit shown in phantom at 29*l*. The springs 71, 71a have a free length approximating the spacing between the spring abutments when the wheel axle is in its unloaded position shown at 29*u* in FIG. 2. Additional stops 84 are conveniently provided to limit downward movement of the wheel axle to the lower limit shown at 29*u* and, as shown in FIG. 2, comprise pins 84 supported by brackets 85 and interposed between the upper edges of the suspension levers and a flange on the base member to limit inward swinging movement of the suspension brackets and hence limit downward movement of the wheel support brackets.

Figure 7:
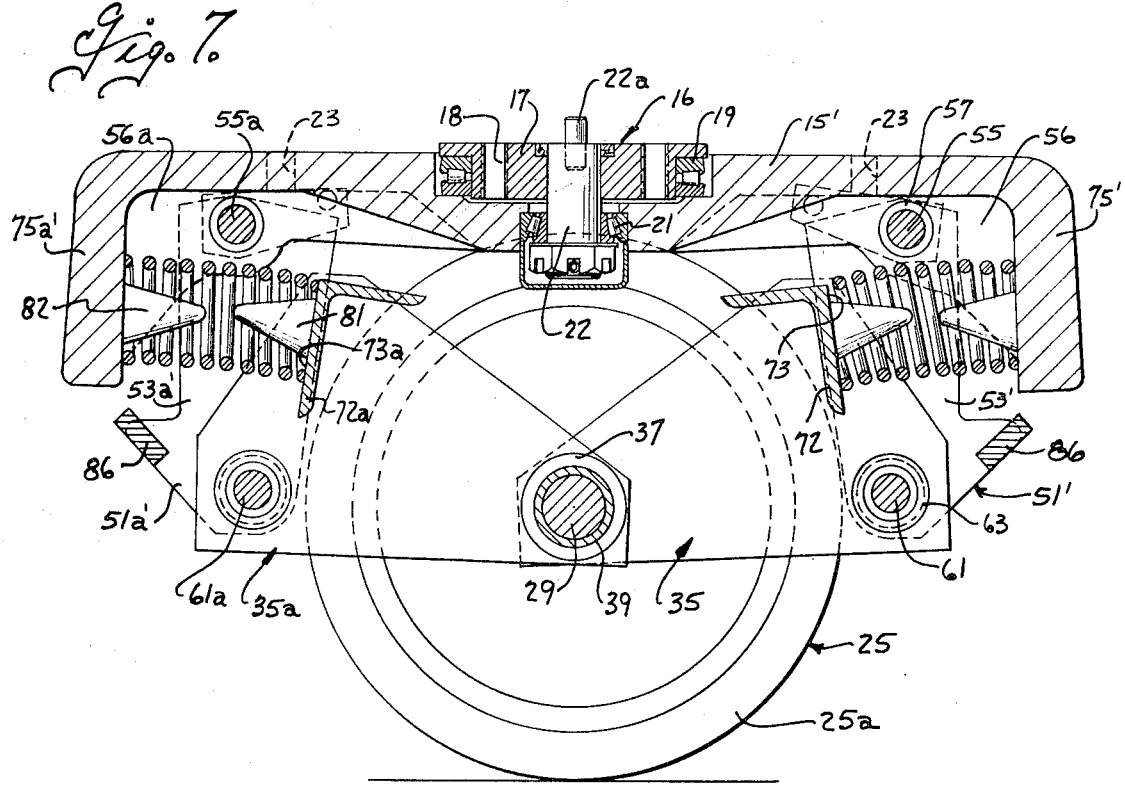
FIG. 7 is a longitudinal sectional view through a modified form of wheel suspension.

The modified form of wheel suspension shown in FIG. 7 is similar to that disclosed in FIGS. 1–5 and like numerals are utilized to designate corresponding parts. In this embodiment, however, forward and rear anchor spring abutments 75' and 75a' are rigidly mounted on the base member to provide forward and rear abutment faces for the forward and rear compression springs. Cross members 86 are advantageously provided between the side plates 53', 53a' of the suspension brackets 51' and 51a' to laterally stabilize the same. The operation of this wheel suspension is generally similar to that previously described except that the anchor abutments for the springs do not shift in the manner previously described during horizontal shifting movement of the suspension brackets.

From the foregoing it is thought that the construction and operation of the shock absorbing wheel suspension will be readily understood. The wheel support brackets and suspension brackets support the wheels for vertical and horizontal shifting movement relative to the base member and the forward and rear spring assemblies are arranged so as to both angularly bias the wheel support brackets in a direction to oppose vertical movement of the wheel and also horizontally bias the wheel support brackets in relatively opposite direction for centering the wheel assembly.

While preferred embodiments of the present invention have been herein specifically illustrated and described, it will be apparent to those skilled in the art that modifications can be made within the scope of the present invention as defined in the following claims.

The embodiments of the invention in which an exclusive property or privilege is claimed are defined as follows:

1. A shock absorbing wheel suspension for vehicles comprising, a rigid base member, at least one ground engaging wheel having axle means for rotatably supporting the wheel, forward and rear wheel support brackets having their adjacent ends connected to said axle means for relative pivotal movement, said forward and rear wheel support brackets respectively extending forwardly and rearwardly from said axle means, forward and rear suspension brackets each having lower pivot means paralleling said axle means and pivotally connecting their lower ends to the outer ends of the respective forward and rear wheel support bracket, said forward and rear suspension brackets having upper pivot means paralleling said axle means and pivotally connecting their upper ends to said base member at horizontally spaced locations, said forward and rear wheel support brackets respectively having forward and rear bracket abutments rigid therewith and extending above and transverse to a plane through the axle means and the respective lower pivot means, forward and rear coil type compression spring means respectively having one end engaging said forward and rear bracket abutments for yieldably biasing the forward and rear wheel support brackets angularly about the respective lower pivot means to yieldably oppose movement of the wheel upwardly relative to the base member and for also yieldably biasing the forward and rear wheel support brackets horizontally in relatively opposite directions toward a center position relative to said base member, and means defining forward and rear anchor abutments respectively spaced forwardly and rearwardly from the forward and rear bracket abutments at locations intermediate the respective upper and lower pivot means and engaging the other ends of the respective forward and rear compression springs for connecting the same to the base member.

2. A shock absorbing wheel suspension according to claim 1 wherein said means defining forward and rear anchor abutments comprise forward and rear abutment means rigid with the base member.

3. A shock absorbing wheel suspension according to claim 1 wherein the forward bracket abutments and the forward anchor abutments define faces engaging opposite ends of the forward spring means and which diverge upwardly relative to each other at an acute angle when the wheel is unloaded and move toward a parallel position as a load is applied to the wheel, and the rear bracket abutments and the rear spring abutments define faces engaging opposite ends of the rear spring means and which diverge upwardly at an acute angle relative to each other when the wheel is unloaded and move toward a parallel position as a load is applied to the wheel.

4. A shock absorbing wheel suspension according to claim 1 wherein said means defining forward and rear anchor abutments comprise forward and rear abutment means respectively rigid with the forward and rear suspension brackets at locations intermediate the respective upper and lower pivot means to provide anchor abutments that shift relative to the base member with the suspension brackets.

5. A shock absorbing wheel suspension according to claim 1 including means mounting the base member for turning movement about an upright axis vertically aligned with the axle means when the wheel is in its center position.

6. A shock absorbing wheel suspension for vehicles comprising, a rigid base member, at least one ground engaging wheel having axle means for rotatably supporting the wheel, forward and rear wheel support brackets having their adjacent ends connected to said axle means for relative pivotal movement, said forward and rear support brackets respectively extending forwardly and rearwardly from said axle means, forward and rear suspension brackets each having lower pivot means paralleling said axle means and pivotally connecting their lower ends to the outer ends of the respective forward and rear wheel support bracket, said forward and rear suspension brackets having upper pivot means paralleling siad axle means and pivotally connecting their upper ends to said base member at horizontally spaced locations, forward and rear coil type compression spring means extending generally lengthwise of the wheel assembly intermediate the upper and lower pivot means on the respective forward and rear suspension brackets, means defining forward and rear anchor abutments respectively engaging outer ends of forward and rear compression spring means for connecting the same to the base member, said forward and rear wheel support brackets having portions rigid therewith and extending above a plane through the axle means and the respective lower pivot means defining forward and rear bracket abutments respectively engaging the inner ends of the forward and rear compression spring means and movable with the respective wheel support bracket from a position disposed at an acute angle to the respective anchor abutment when the wheel is unloaded toward a position paralleling the respective anchor abutment as a load is applied to the wheel, said forward and rear spring means yieldably biasing the forward and rear wheel support brackets angularly about the respective lower pivot means to yieldably oppose movement of the wheel upwardly relative to the base member and said forward and rear spring means also yieldably biasing said forward and rear wheel support brackets horizontally in relatively opposite directions toward a center position relative to said base member.

7. A shock absorbing wheel suspension according to claim 6 wherein said means defining anchor abutments comprise forward and rear abutment means rigid with said base member.

8. A shock absorbing wheel suspension according to claim 6 wherein said means defining anchor abutments comprise forward and rear abutment means rigid with the respective forward and rear suspension brackets at locations intermediate their upper and lower pivot means.

9. A shock absorbing wheel suspension according to claim 6 wherein said anchor abutments define generally upright spring abutment faces.

10. A shock absorbing wheel suspension according to claim 6 including means mounting said base member for turning movement about an upright axis vertically aligned with the axle means when the wheel is in its center position.

11. A shock absorbing wheel assembly according to claim 10 wherein a pair of axially spaced wheels are mounted on the axle means and located at relatively opposite sides of the upright turning axis of the base.

12. A shock absorbing wheel suspension for vehicles comprising, a rigid base member, at least one ground engaging wheel having axle means for rotatably supporting the wheel, forward and rear wheel support brackets having their adjacent ends connected to said axle means for relative pivotal movement, said forward and rear support brackets respectively extending forwardly and rearwardly from said axle means, forward and rear suspension brackets each having lower pivot means paralleling said axle means and pivotally connecting their lower ends to the outer ends of the respective forward and rear wheel support bracket, said forward and rear suspension brackets having upper pivot means paralleling said axle means and pivotally connecting their upper ends to said base member at horizontally spaced locations, outer spring abutment means on each of said suspension brackets spaced below their respective upper pivot means and above the respective lower pivot means, inner spring abutment means on each of said wheel support brackets spaced above a plane through the axle means and the respective lower pivot means and located inwardly of the outer spring abutment means on the suspension brackets, and forward and rear compression spring means respectively disposed between the outer and inner spring abutment means on the forward and rear suspension brackets and wheel support brackets for yieldably opposing upward movement of the wheel and for urging the wheel toward a center position.

13. A shock absorbing wheel suspension according to claim 12 wherein said spring means are of the coil type and the inner and outer spring abutment means associated with each spring means define faces which diverge upwardly relative to each other when the wheel is unloaded and move toward a generally parallel position as a load is applied to the wheel suspension.

14. A shock absorbing wheel suspension according to claim 12 wherein said spring means are of the coil type, said outer spring abutment means defining faces which extend generally upright and said inner spring abutment means defining faces which diverge upwardly relative to the associated outer spring abutment means when the wheel suspension is unloaded, and said inner spring abutment means move toward a position generally parallel to the associated outer spring abutment means as load is applied to the wheel suspension.

15. A shock absorbing wheel suspension according to claim 12 including means for mounting said base member for turning movement about an upright axis vertically aligned with said axle means when said wheel is in its center position.

* * * * *